(12) United States Patent
Chavez

(10) Patent No.: US 11,904,787 B1
(45) Date of Patent: Feb. 20, 2024

(54) FORWARD MOUNT COMPACT PASSENGER AIRBAG MODULE WITH PASSIVE GAS MODULATION

(71) Applicant: GM GLOBAL TECHNOLOGY OPERATIONS LLC, Detroit, MI (US)

(72) Inventor: Spencer William Chavez, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/149,409

(22) Filed: Jan. 3, 2023

(51) Int. Cl.
  *B60R 21/205* (2011.01)
  *B60R 21/233* (2006.01)
  *B60R 21/231* (2011.01)
  *B60R 21/215* (2011.01)

(52) U.S. Cl.
  CPC .......... *B60R 21/205* (2013.01); *B60R 21/215* (2013.01); *B60R 21/231* (2013.01); *B60R 21/233* (2013.01); *B60R 2021/23107* (2013.01); *B60R 2021/23308* (2013.01); *B60R 2021/23324* (2013.01)

(58) Field of Classification Search
  CPC ... B60R 21/205; B60R 21/233; B60R 21/215; B60R 21/231; B60R 2021/23324; B60R 2021/23107; B60R 2021/23308; B60R 2021/23316
  USPC ... 280/729, 730.1, 743.1, 732, 728.2, 728.3, 280/728.1
  See application file for complete search history.

(56) References Cited

U.S. PATENT DOCUMENTS 11,225,216 B1 * 1/2022 Lin .................. B60R 21/23138
2017/0247007 A1 * 8/2017 Lee ....................... B60R 21/231

FOREIGN PATENT DOCUMENTS

| DE | 102014008599 A1 * | 12/2014 | ....... B60R 21/23138 |
| JP | 2008296785 A    * | 12/2008 | |
| JP | 2017213930 A    * | 12/2017 | ....... B60R 21/23138 |

* cited by examiner

*Primary Examiner* — Keith J Frisby
(74) *Attorney, Agent, or Firm* — CANTOR COLBURN LLP

(57) ABSTRACT

An airbag system for a vehicle includes an inflator, and a cushion operably connected to the inflator including a plurality of sealed cushion segments interconnected by a plurality of cushion joints. The activation of the inflator dispenses a flow of inflation gas into the cushion to sequentially inflate the plurality of sealed cushion segments from a stowed state to a deployed state. A passenger compartment of a vehicle includes an instrument panel including at least an upper panel surface and a downward panel surface, and an airbag system located in the instrument panel.

18 Claims, 4 Drawing Sheets

FORWARD MOUNT COMPACT PASSENGER AIRBAG MODULE WITH PASSIVE GAS MODULATION

INTRODUCTION

The subject disclosure relates to vehicles, and more particularly to passenger airbag systems for vehicles.

In a typical vehicle, airbag systems are provided that when deployed in a crash event interact with a vehicle occupant to absorb energy of occupant motion to prevent or reduce injury to the occupant. A vehicle passenger airbag system is typically housed in a rearward most portion of the vehicle instrument panel, and includes an inflatable cushion and a mechanism to inflate the cushion when activated. The inflated cushion is typically a 3 dimensional spherical or spherelike shape.

In current vehicles, the instrument panels often include protrusions, such as screens, that protrude from an upper surface or a rearward surface of the instrument panel. Such protrusions present an additional potential impact area of a vehicle passenger during a crash event, especially if the passenger is outside of a typical position, or is forced out of the typical predicted position by the crash event.

SUMMARY

In one exemplary embodiment an airbag system for a vehicle includes an inflator, and a cushion operably connected to the inflator including a plurality of sealed cushion segments interconnected by a plurality of cushion joints. The activation of the inflator dispenses a flow of inflation gas into the cushion to sequentially inflate the plurality of sealed cushion segments from a stowed state to a deployed state.

In addition to one or more of the features described herein one or more internal vents are located in the plurality of sealed cushion segments.

In addition to one or more of the features described herein the one or more internal vents are located at the plurality of cushion joints.

In addition to one or more of the features described herein the one or more internal vents are one or more slits in a separator wall between adjacent sealed cushion segments of the plurality of sealed cushion segments.

In addition to one or more of the features described herein a housing is included in which the cushion is located when in the stowed state.

In addition to one or more of the features described herein the housing includes a door extending across a door opening. The cushion extends through the door opening when in the deployed state.

In another exemplary embodiment, a passenger compartment of a vehicle includes an instrument panel including at least an upper panel surface and a downward panel surface, and an airbag system located in the instrument panel. The airbag system includes a housing, and an inflator located in the housing. A cushion is operably connected to the inflator and is located in the housing when in a stowed state. The cushion includes a plurality of sealed cushion segments interconnected by a plurality of cushion joints. The activation of the inflator dispenses a flow of inflation gas into the cushion to sequentially inflate the plurality of sealed cushion segments from the stowed state to a deployed state.

In addition to one or more of the features described herein at least one cushion segment of the plurality of sealed cushion segments extends along the upper panel surface.

In addition to one or more of the features described herein at least one cushion segment of the plurality of sealed cushion segments extends along the downward panel surface.

In addition to one or more of the features described herein a screen extends upwardly from the upper panel surface and an airbag door and door opening located in the upper panel surface. The door and door opening are located between the screen and a windshield of the vehicle.

In addition to one or more of the features described herein at least one cushion segment of the plurality of sealed cushion segments extends across the screen.

In addition to one or more of the features described herein at least one cushion segment of the plurality of sealed cushion segments is aligned with the center of gravity of one of a head or torso of a vehicle passenger.

In addition to one or more of the features described herein one or more internal vents are located in the plurality of sealed cushion segments.

In addition to one or more of the features described herein the one or more internal vents are located at the plurality of cushion joints.

In addition to one or more of the features described herein the one or more internal vents are one or more slits in a separator wall between adjacent sealed cushion segments of the plurality of sealed cushion segments.

In another exemplary embedment, a vehicle includes a vehicle body defining a passenger compartment therein. An instrument panel extends at least partially across the passenger compartment. The instrument panel includes at least an upper panel surface and a downward panel surface. An airbag system is located in the instrument panel. The airbag system includes a housing, an inflator located in the housing, and a cushion operably connected to the inflator and positioned in the housing when in a stowed state. The cushion includes a plurality of sealed cushion segments interconnected by a plurality of cushion joints. The activation of the inflator dispenses a flow of inflation gas into the cushion to sequentially inflate the plurality of sealed cushion segments from the stowed state to a deployed state.

In addition to one or more of the features described herein a screen extends upwardly from the upper panel surface and an airbag door and door opening located in the upper panel surface. The door and door opening are located between the screen and a windshield of the vehicle.

In addition to one or more of the features described herein at least one cushion segment of the plurality of sealed cushion segments extends across the screen.

In addition to one or more of the features described herein at least one cushion segment of the plurality of sealed cushion segments is aligned with the center of gravity of one of a head or torso of a vehicle passenger.

In addition to one or more of the features described herein one or more internal vents are located in the plurality of sealed cushion segments.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
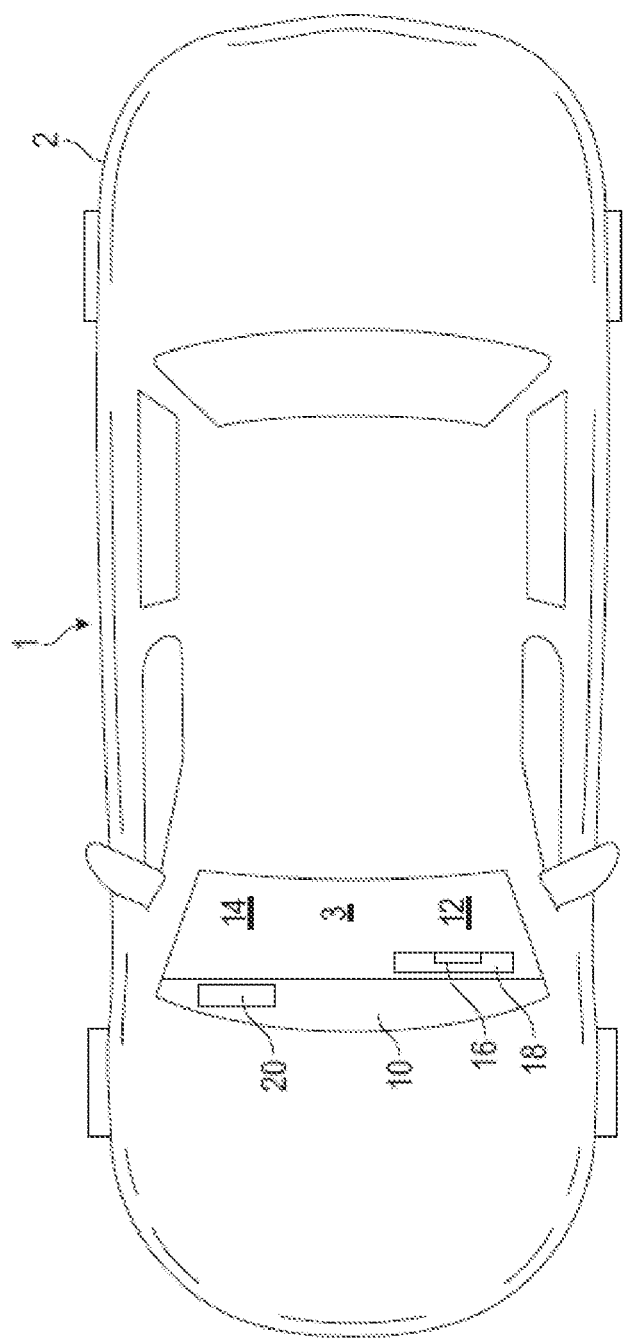
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is an embodiment of a vehicle 1. The vehicle 1 includes a vehicle body 2, which defines an occupant compartment 3 in an interior of the vehicle 1. The occupant compartment 3 includes an instrument panel 10 extending across the occupant compartment 3. The occupant compartment 3 includes a driver's side 12 in which a vehicle driver is seated and from which the vehicle driver operates and controls the vehicle 1. A passenger side 14 is located laterally beside the driver's side 12 in which a vehicle passenger may be seated. The vehicle 1 includes one or more airbag systems, which may include a driver's side air bag system 16 located in, for example, a steering wheel 18 of the vehicle, and a passenger side air bag system 20, which may be located in the instrument panel 10. Embodiments of the passenger side air bag system 20 are described below with reference to FIGS. 2 and 3.

Figure 2:
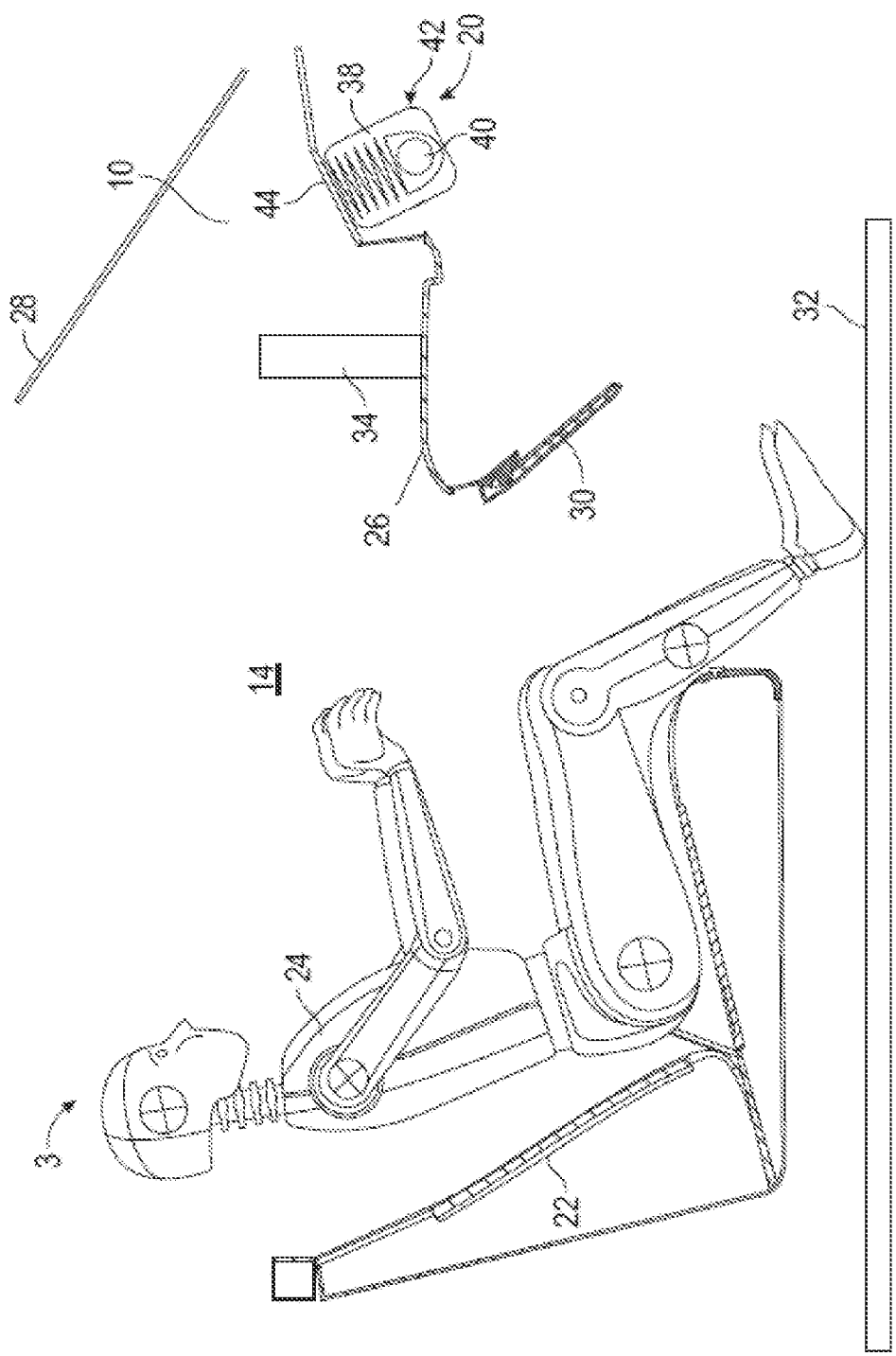
FIG. 2 is a schematic illustration of an embodiment of an airbag system in a stowed position in a vehicle.

FIG. 2 is a schematic illustration of the passenger side 14 of the occupant compartment 3 of the vehicle 1. The passenger side 14 includes a passenger seat 22 in which the vehicle passenger 24 may be seated. The passenger seat 22 is secured, either directly or indirectly, to a floor 32 of the vehicle body 2. The instrument panel 10 includes an upper panel surface 26 that extends away from the passenger seat 22 toward a windshield 28 of the vehicle 1. The instrument panel 10 further includes a downward panel surface 30 that extends generally downwardly from the upper panel surface 26 toward the floor 32. In some embodiments, one or more protrusions, such as a screen 34, extend upwardly from the upper panel surface 26. The screen 34 may be, for example, an entertainment screen, navigation screen or a multi-use screen. While a screen 34 is illustrated and described herein, one skilled in the art will readily appreciate that the configurations of the present disclosure may be readily applied in those vehicles 1 not having a screen 34.

The airbag system 20 is housed in the instrument panel 10. The airbag system 20 includes a cushion 38 in a folded state, and an inflator 40 operably connected to the cushion 38 to inflate the cushion 38 when the airbag system 20 is activated. In some embodiments, the cushion 38 is formed from a woven fabric or yarn. The cushion 38 and the inflator 40 are located in an airbag housing 42 having a door 44 at the upper panel surface 26. In some embodiments, such as shown in FIG. 2, the door 44 is located between the screen 34 and the windshield 28.

Figure 3:
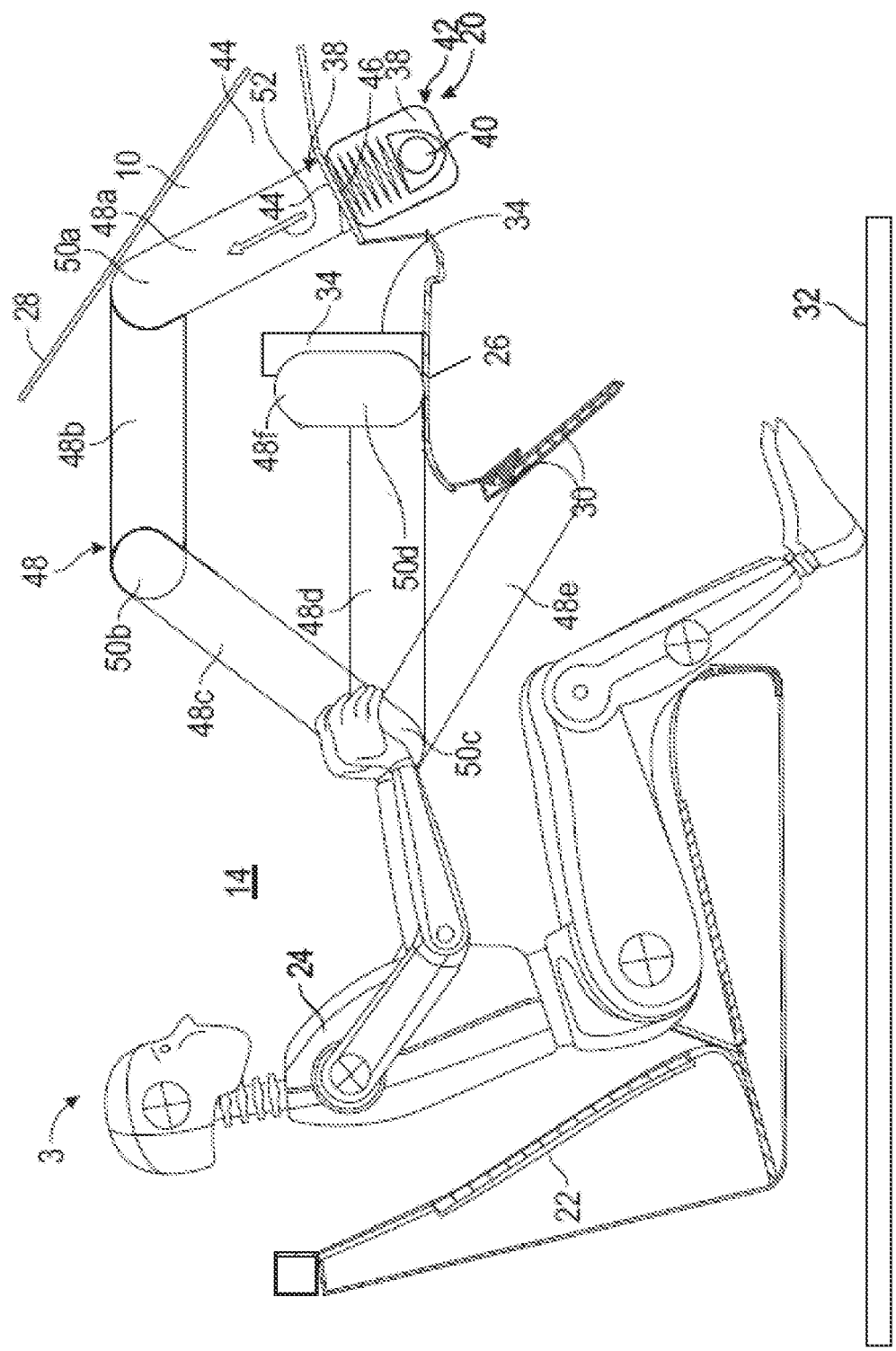
FIG. 3 is a schematic illustration of an embodiment of an airbag system in a deployed position in a vehicle.

Referring now to FIG. 3, in a crash event the airbag system 20 is activated, with the inflator 40 activating to inflate the cushion 38, urging the cushion 38 to displace the door 44 and proceed through a door opening 46 into a deployed state as illustrated. The cushion 38 includes a plurality of interconnected cushion segments 48 that define the sealed cushion 38. The cushion segments 48 are, for example, woven or sewn together, to define chambers of a selected size and loft. In an exemplary embodiment, illustrated in FIG. 3, the cushion 38 includes six cushion segments 48a, 48b, 48c, 48d, 48e, 48f extending from the airbag housing 42, across the upper panel surface 26 and over the screen 34 toward the vehicle passenger 24. Further, the cushion 38 extends along the downward panel surface 30. While six cushion segments 48 are utilized in the illustrated embodiment, one skilled in the art will readily appreciate that the configuration of cushion 38 may vary in both number of cushion segments 48 and size of cushion segments 48.

A first cushion segment 48a extends from the airbag housing 42 generally upwardly from the door opening 46, and in some embodiments generally parallel to the windshield 28. The first cushion segment 48a connects to a second cushion segment 48b at a first cushion joint 50a, with the second cushion segment 48b extending generally toward the vehicle passenger 24. The second cushion segment 48b connects to a third cushion segment 48c at a second cushion joint 50b, with the third cushion segment 48c extending generally downwardly from the second cushion segment 48b. A fourth cushion segment 48d extends from the third cushion segment 48c at a third cushion joint 50c. The fourth cushion segment 48d extends generally away from the vehicle passenger 24 toward the screen 34 and to terminate between the third cushion joint 50c and the screen 34. In some embodiments, a fifth cushion segment 48e extends downwardly from the third cushion joint 50c along the downward panel surface 30. Further, in some embodiments a sixth cushion segment 48f extends from the fourth cushion segment 48d at a fourth cushion joint 50d opposite the third cushion joint 50c. The sixth cushion segment 48f may extend from the fourth cushion joint 50d substantially vertically across the screen 34.

Figure 4:
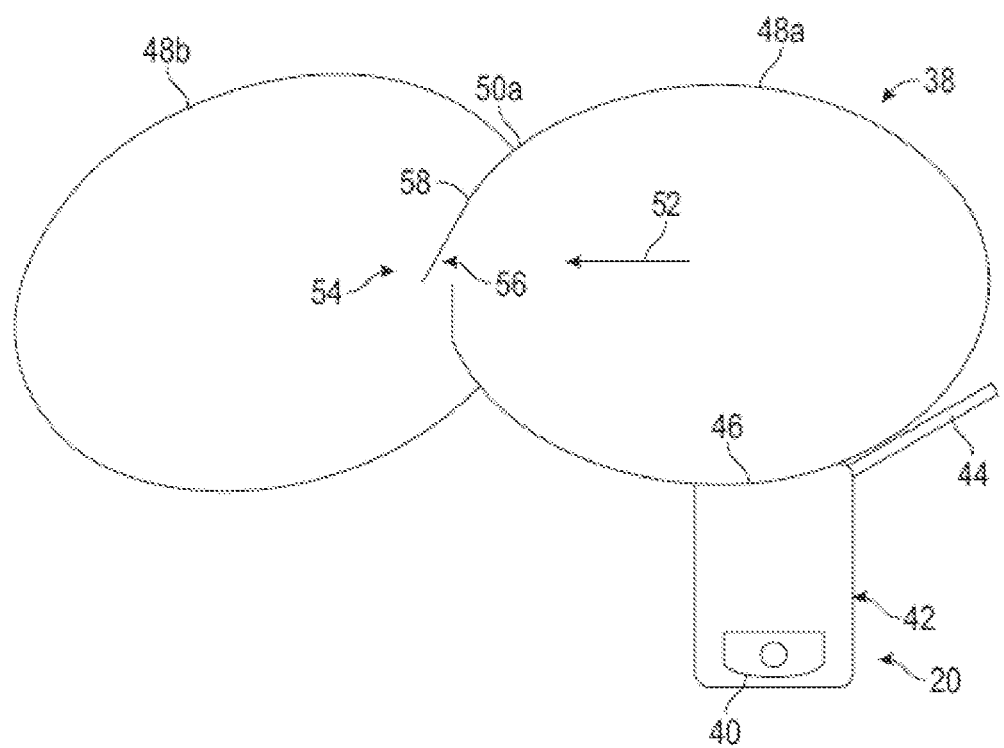
FIG. 4. is an illustration of an embodiment of a vent mechanism between adjacent cushion segments.

In operation, the cushion segments 48a-48f are sequentially inflated via a gas flow 52 generated by the inflator 40. The cushion segments 48a-48f are a series of pressurized chambers. To control inflation of the cushion segments 48a-48f and to allow the gas flow 52 to pass between the cushion segments 48a-48f during inflation, one or more internal vents 54 are disposed in the cushion 38. As shown in FIG. 4, in some embodiments the vents 54 are disposed at one or more of the cushion joints 50a-50d, and may comprise one or more slits 56 in a separator wall 58 extending across the cushion joint 50 and separating adjacent cushion segments 48a-48f. While slits 56 are disclosed herein as the venting mechanism, one skilled in the art will readily appreciate that other vent 54 configurations, such as holes, check valves or the like, may be utilized to enable gas flow 52 in only one direction along the cushion 38; and preventing the gas flow 52 from flowing backward toward the inflator 40. When the cushion segments 48 are pressurized and at equilibrium, the cushion segments 48 will restrain the vehicle passenger 24 through the bending or compression of the pressurized cushion segments 48.

Referring again to FIG. 3, in some embodiments the cushion segments 48 are located to align with the center of gravity of the head and torso of the vehicle passenger 24. The deformation of the cushion segments 48 enables energy management of the vehicle passenger 24 during a crash event. For example, the second cushion segment 48b extends such that the second cushion segment 48b dampens impact forces from, for example, a head of the passenger 24. The forces are dampened along the length of the second cushion segment 48b between the second cushion joint 50b and the first cushion joint 50a. Similarly, the fourth cushion segment 48d is configured to dampen impact forces from, for example, a torso of the passenger 24; preventing direct impact of the passenger 24 into the screen 34. Additionally, the fifth cushion segment 48e is configured to absorb knee or lower body impact forces of the passenger 24.

The location of the door 44 and the door opening 46 between the screen 34 and the windshield 28 and the segmented construction and deployment of the cushion 38 allows for the use of larger screens 34 or other obstructions to traditional airbag deployment. Further, the configuration of the cushion 38 configuration allows for protection of the vehicle passenger 34 from impact with the screen 34.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An airbag system for a vehicle, comprising:
   an inflator; and
   a cushion operably connected to the inflator including a plurality of sealed cushion segments interconnected by a plurality of cushion joints;
   wherein the activation of the inflator dispenses a flow of inflation gas into the cushion to sequentially inflate the plurality of sealed cushion segments from a stowed state to a deployed state;
   wherein at at least one cushion joint of the plurality of cushion joints, a first sealed cushion segment extends in a first direction from the at least one cushion joint, a second sealed cushion segment extends in a second direction from the at least one cushion joint, and a third sealed cushion segment extends in a third direction from the at least one cushion joint;
   wherein the first sealed cushion segment and the second sealed cushion segment define a first acute angle therebetween; and
   wherein the second sealed cushion segment and the third sealed cushion segment define a second acute angle therebetween.

2. The airbag system of claim 1, further comprising one or more internal vents disposed in the plurality of sealed cushion segments.

3. The airbag system of claim 2, wherein the one or more internal vents are disposed at the plurality of cushion joints.

4. The airbag system of claim 3, wherein the one or more internal vents are one or more slits in a separator wall between adjacent sealed cushion segments of the plurality of sealed cushion segments.

5. The airbag system of claim 1, further comprising a housing in which the cushion is disposed when in the stowed state.

6. The airbag system of claim 5, wherein the housing includes a door extending across a door opening, the cushion extending through the door opening when in the deployed state.

7. A passenger compartment of a vehicle, comprising:
   an instrument panel including at least an upper panel surface and a downward panel surface; and
   an airbag system disposed in the instrument panel, including:
      a housing;
      an inflator disposed in the housing; and
      a cushion operably connected to the inflator and disposed in the housing when in a stowed state, the cushion including a plurality of sealed cushion segments interconnected by a plurality of cushion joints;
   wherein activation of the inflator dispenses a flow of inflation gas into the cushion to sequentially inflate the plurality of sealed cushion segments from the stowed state to a deployed state;
   further comprising a screen extending upwardly from the upper panel surface and an airbag housing door and door opening located in the upper panel surface, wherein the airbag housing door and door opening are disposed between the screen and a windshield of the vehicle.

8. The passenger compartment of claim 7, wherein at least one cushion segment of the plurality of sealed cushion segments extends along the upper panel surface.

9. The passenger compartment of claim 7, wherein at least one cushion segment of the plurality of sealed cushion segments extends along the downward panel surface.

10. The passenger compartment of claim 7, wherein at least one cushion segment of the plurality of sealed cushion segments extends across the screen.

11. The passenger compartment of claim 7, wherein at least one cushion segment of the plurality of sealed cushion segments is aligned with an expected location of the center of gravity of one of a head or torso of a vehicle passenger.

12. The passenger compartment of claim 7, further comprising one or more internal vents disposed in the plurality of sealed cushion segments.

13. The passenger compartment of claim 12, wherein the one or more internal vents are disposed at the plurality of cushion joints.

14. The passenger compartment of claim 13, wherein the one or more internal vents are one or more slits in a separator wall between adjacent sealed cushion segments of the plurality of sealed cushion segments.

15. A vehicle, comprising:
   a vehicle body defining a passenger compartment therein;
   an instrument panel extending at least partially across the passenger compartment, the instrument panel including at least an upper panel surface and a downward panel surface; and an airbag system disposed in the instrument panel, including:
- a housing;
- an inflator disposed in the housing; and
- a cushion operably connected to the inflator and disposed in the housing when in a stowed state, the cushion including a plurality of sealed cushion segments interconnected by a plurality of cushion joints;

wherein activation of the inflator dispenses a flow of inflation gas into the cushion to sequentially inflate the plurality of sealed cushion segments from the stowed state to a deployed state;

further comprising a screen extending upwardly from the upper panel surface and an airbag housing door and door opening located in the upper panel surface, wherein the airbag housing door and door opening are disposed between the screen and a windshield of the vehicle.

16. The vehicle of claim 15, wherein at least one cushion segment of the plurality of sealed cushion segments extends across the screen.

17. The vehicle of claim 15, wherein at least one cushion segment of the plurality of sealed cushion segments is aligned with an expected location of the center of gravity of one of a head or torso of a vehicle passenger.

18. The vehicle of claim 15, further comprising one or more internal vents disposed in the plurality of sealed cushion segments.

* * * * *